United States Patent [19]

Hatano et al.

[11] Patent Number: 5,377,015
[45] Date of Patent: Dec. 27, 1994

[54] IMAGE PROCESSING DEVICE FOR CONVERTING A SCANNED IMAGE INTO A MONOCHROME IMAGE

[75] Inventors: Rikuo Hatano; Toshimitsu Oka, both of Aichi, Japan

[73] Assignee: Aisin Seiki Kabushiki Kaisha, Kariya, Japan

[21] Appl. No.: 762,053

[22] Filed: Sep. 19, 1991

Related U.S. Application Data

[63] Continuation of Ser. No. 432,812, Nov. 7, 1989, abandoned.

[30] Foreign Application Priority Data

Nov. 7, 1988 [JP] Japan .................. 63-281075

[51] Int. Cl.⁵ .............................................. H04N 1/23
[52] U.S. Cl. ...................................... 358/401; 358/298; 358/456
[58] Field of Search ............... 358/456, 465, 466, 298, 358/401; 307/358, 264; 328/146, 147

[56] References Cited

U.S. PATENT DOCUMENTS

| | | | |
|---|---|---|---|
| 3,830,967 | 8/1974 | Long | 358/456 |
| 3,911,212 | 10/1975 | Yoshizawa et al. | 358/465 |
| 4,247,873 | 1/1981 | Decuyper | 358/466 |
| 4,446,486 | 5/1984 | Itoh | 307/358 |
| 4,554,594 | 11/1985 | Ciardiello et al. | 358/456 |
| 4,574,206 | 3/1986 | Todokoro et al. | 328/147 |
| 4,588,905 | 5/1986 | Kojima | 307/358 |
| 4,601,058 | 7/1986 | Seto | 358/465 |
| 4,626,922 | 12/1986 | Saitoh | 358/466 |
| 4,731,862 | 3/1988 | Tsuda et al. | 358/465 |
| 4,870,499 | 9/1989 | Suzuki et al. | 358/456 |
| 5,005,427 | 4/1991 | Ohmae | 307/358 |

FOREIGN PATENT DOCUMENTS

| | | | |
|---|---|---|---|
| 0006715 | 1/1980 | European Pat. Off. | 358/465 |
| 2800759 | 7/1979 | Germany | 358/298 |
| 0196072 | 10/1985 | Japan | 358/456 |
| 62-277857 | 2/1987 | Japan . | |

Primary Examiner—Curtis Kuntz
Assistant Examiner—Jill Jackson
Attorney, Agent, or Firm—Sughrue, Mion, Zinn, Macpeak & Seas

[57] ABSTRACT

An image processing device for converting a scanned image into a monochrome image includes a scanner for providing an image signal which is applied to a sampling and holding circuit. The output of the scanning and holding circuit is supplied to a peak hold circuit and to a comparator. The output of the peak hold circuit is also applied to the comparator and the output of the comparator is supplied to a D-type flip flop circuit, the output of which is fed back to the input to the comparator from the scanning and holding circuit. The D-type flip flop generates an alteration of black and white level signals when the output from the sampling and holding circuit is close to the threshold level whereby a printer will print alterations of black and white dots.

7 Claims, 3 Drawing Sheets

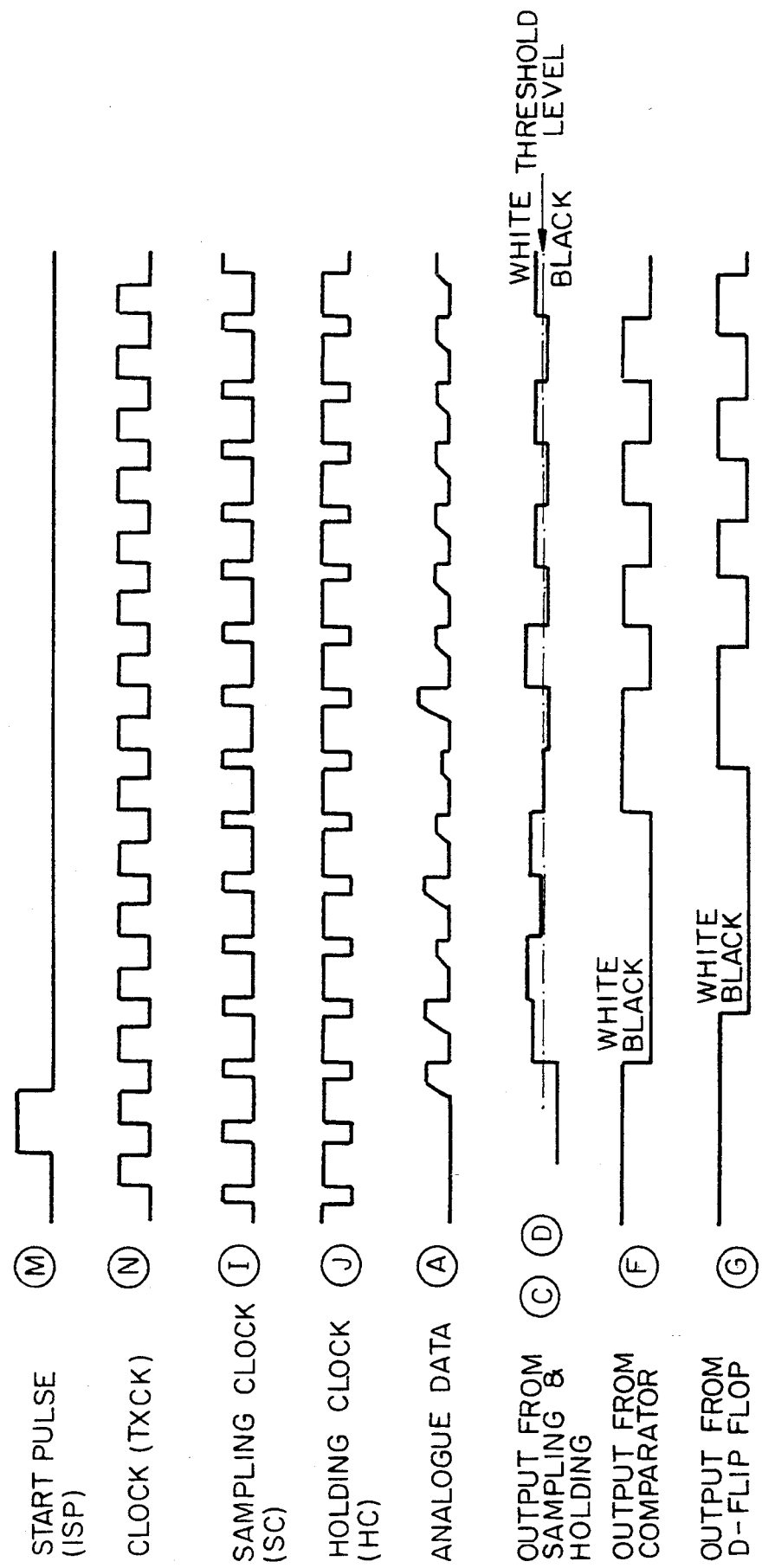

IMAGE PROCESSING DEVICE FOR CONVERTING A SCANNED IMAGE INTO A MONOCHROME IMAGE

This is a continuation of application Ser. No. 07/432,812, filed Nov. 7, 1989 now abandoned.

BACKGROUND OF THE INVENTION

This invention relates to an image processing device for converting a scanned image into a monochrome image, and more particularly relates to an image processing device for processing a half tone between a black level and a white level.

A conventional device converts a scanned image into a black and white image in order to process and to transmit the scanned image easily. Japanese laid open patent application Ser. No. 62-277857 published on Dec. 2, 1987 discloses a circuit for converting the scanned image into a black and white image. The circuit samples and holds a peak level of the scanned image signal in order to determine a threshold level. The circuit compares the image signal with the threshold level and generates a corresponding image signal having only black and white levels.

However, the conventional device cannot process half tones between black and white levels, because the half tone levels fall into one of the black and the white levels. Additional circuits for determining double or triple threshold levels are required in order to process the half tone levels.

SUMMARY OF THE INVENTION

Accordingly, one of the objects of this invention is to obviate the above mentioned conventional drawback.

It is also an object of this invention to process half tone levels. To achieve these objects, and in accordance with the principles of this invention as embodied and broadly described herein, an image processing device for converting a scanned image into a monochrome image includes comparing means for comparing a threshold level in order to separate image signals into either a white or a black level, and half tone signal generating means for generating an alteration of the white and the black levels if the image signal is almost equal to the threshold level.

BRIEF DESCRIPTION OF THE DRAWINGS

The accompanying drawings, which are incorporated in and constitute a part of the specification, illustrate an embodiment of this invention, and, together with the description, serve to explain the principles of the invention. In the drawings:

FIG. 3 is a timing chart illustrating various wave forms at selected points in FIG. 1.

DETAILED DESCRIPTION OF THE PREFERRED EMBODIMENT

Reference will now be made in detail to the present embodiment of the invention, an example of which is illustrated in the accompanying drawings.

Figure 2:
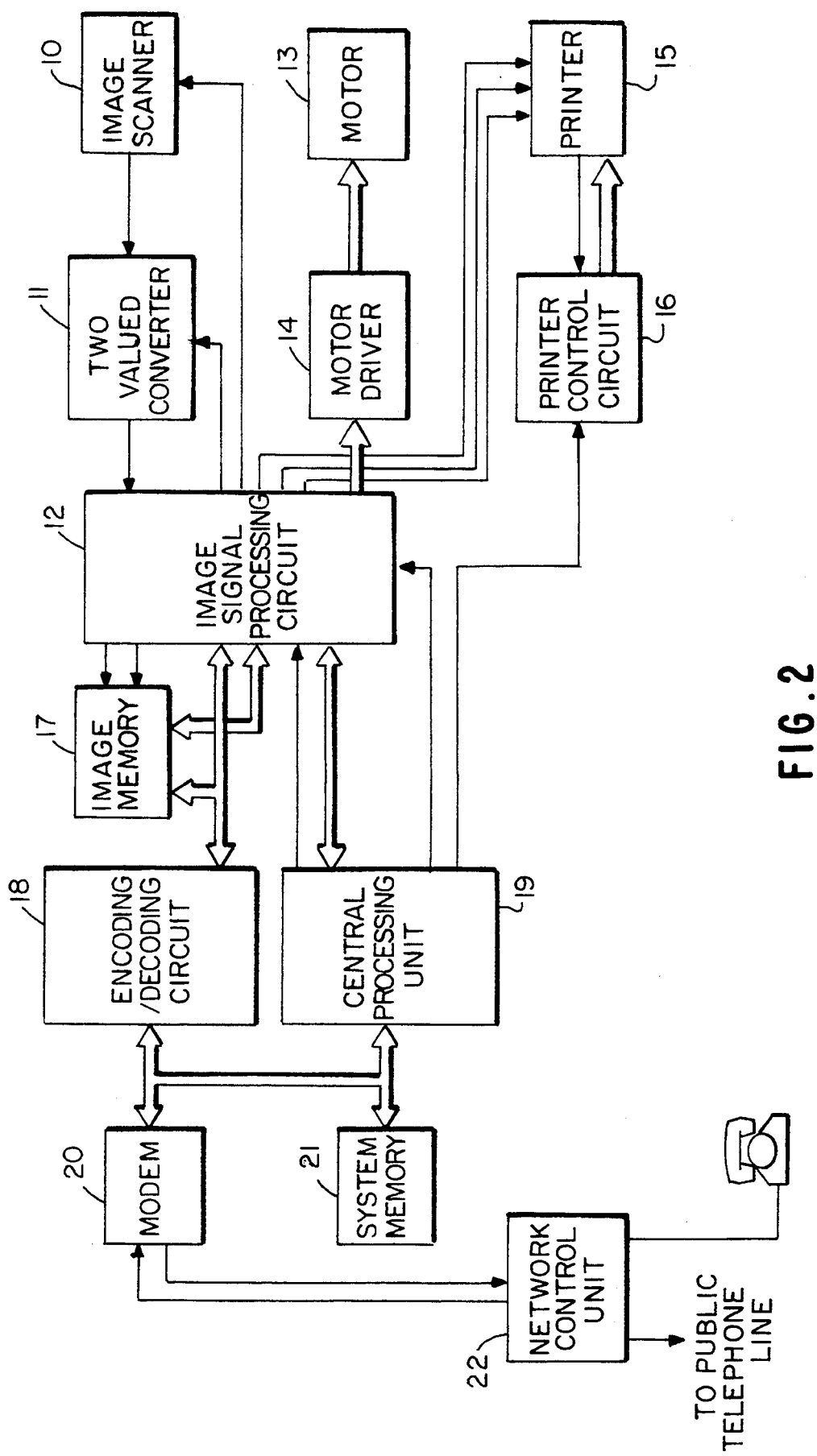
FIG. 2 is a block diagram including the device in FIG. 1.

Referring now to FIG. 2, a block diagram of the facsimile machine will be explained. First of all, a mode for transmitting a scanned image will be explained.

An image signal processing circuit (12) drives a motor (13) through a motor driver (14). The motor (13) feeds a document having some images to an image scanner (10). The image scanner (10) scans the image line by line, and generates an image signal which corresponds to the scanned image. The image scanner (10) divides the images on the document into many image spots, and converts each luminosity of scanned spots into a corresponding voltage. If the luminosity of the scanned spot is high, which means that the scanned spot is close to white, the image scanner (10) generates a high voltage.

The voltage which is converted by the image scanner (10) is transmitted to a two valued converter (11) in a synchronous manner with clock pulses supplied from the image signal processing circuit (12). The two valued converter (11) converts the analogue signal from the image scanner (10) into a two valued signal. The two valued signal is transmitted to the image signal processing circuit (12). The image signal processing circuit (12) memorizes the image signal, which is transmitted from the two valued converter (11), in an image memory (17) temporarily.

The image signal processing circuit (12) is controlled by a motor control signal, an image memory control signal and the clock pulses which are generated by the central processing unit (19). The image data which are memorized in the image memory (17) are read out by an encoding and decoding circuit (18) in response to an operation of the central processing unit (19). The encoding and decoding circuit (18) encodes the read out data. The encoded data which are encoded by the encoding and decoding circuit (18) are modulated by a modem (20). The modem (20) transmits the data to a public telephone line through network control unit (22).

Next, a mode for receiving the image data will be explained. The image data which are received from the public telephone line are transmitted to the modem (20) through the network control unit (22). The modem (20) demodulates the received image data. The demodulated image data are memorized in the system memory (21). The data which are stored in the system memory (21) are transmitted to the encoding and decoding circuit (18) in response to the operation of the central processing unit (19). The encoding and decoding circuit (18) decodes the image data. The decoded data are memorized in the image memory (17) temporarily. The image signal processing circuit (12) reads out the data memorized in the image memory (17) and transmits the read out data to a printer (15) in response to the operation of the central processing unit (19). The printer (15) prints the image data on a blank paper. The printer (15) is controlled by a print control circuit (16).

Figure 1:
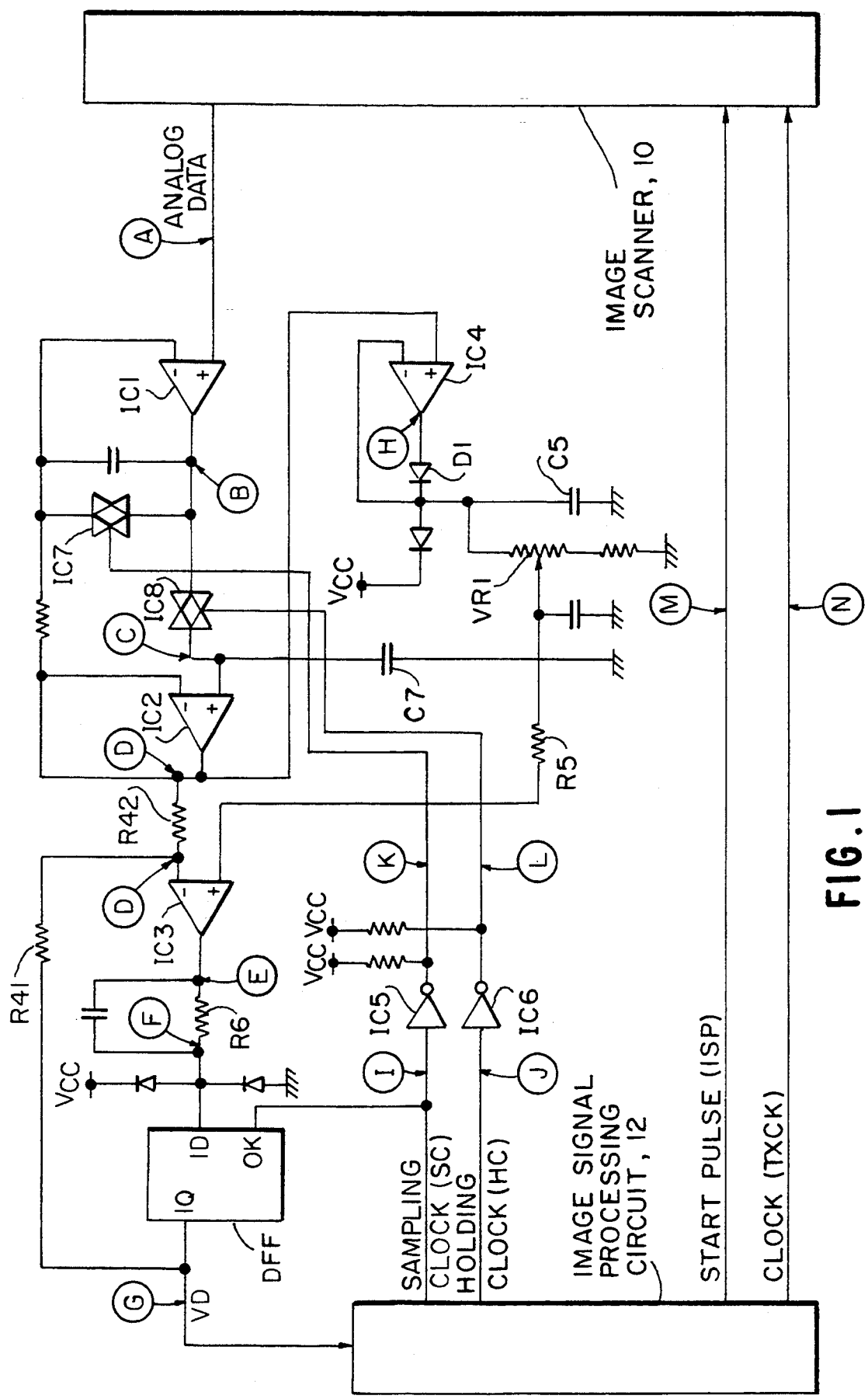
FIG. 1 is a circuit diagram of the image processing device in accordance with the present invention.

Referring now to FIG. 1, the two valued converter (11) which is used in the present invention is explained in detail.

A start pulse (ISP) and scanning clock pulses (TXCK) are supplied from the image signal processing circuit (12) to the image scanner (10). As shown in FIG. 3 at 'M', 'N', and 'A', the image scanner (10) start scanning as soon as the start pulse (ISP) raises up. The image scanner (10) converts the luminosity of one scanned spot into an image signal, while the scanning clock pulses (TXCK) have a low level. The image scanner (10) selects the other scanned spot as soon as the scanning clock pulses (TXCK) rise up to a high level signal.

The image signal which is converted by the image scanner (10) is applied to a sampling and holding circuit. The sampling and holding circuit comprises an operational amplifier (IC1), analogue switches (IC7, IC8) and the operational amplifier (IC2). The image signal which is converted by the image scanner (10) is applied to a non-inverted input of the operational amplifier (IC1).

An output of the operational amplifier (IC1) is connected to an inverted input of the operational amplifier (IC1) through the analogue switch (IC7). While the analogue switch (IC7) is turned on, the output and the inverted input of the operational amplifier (IC1) are connected. Under this situation, the operational amplifier acts as a voltage follower. Alternatively, while the analogue switch (IC7) is turned off, the operational amplifier (IC1) acts as an enhancer for enhancing a change of tone. The operational amplifier (IC1) compares the image signal which is fed from the image scanner (10) with the previous image signal which is memorized in the capacitor (C7). Therefore, if the image signal decreases from the white level to the gray level, the gray level is reduced a little by the operational amplifier (IC1). When the image signal is increased from the black level to the gray level, the gray level is raised a little by the operational amplifier (IC1).

The analogue switch (IC7) is controlled by a sampling clock (SC) which is supplied from the image signal processing circuit (12) through an invertor (IC5). While the sample clock (SC) has a low level, the invertor (IC5) generates a high level signal so that the analogue switch (IC7) is turned on. Contrary, while the sample clock (SC) has a high level, the invertor (IC5) generates a low level signal so that the analogue switch (IC7) it turned off.

The analogue switch (IC8) is connected to the output of the operational amplifier (IC1). Further, a capacitor (C7) is connected to the analogue switch (IC8).

The analogue switch (IC8) is controlled by the holding clock (HC) which is supplied from the image signal processing circuit (12). The holding clock (HC) is an inverted signal of the sampling clock (SC). While the holding clock (HC) has a low level, the analogue switch (IC8) is turned on. Therefore, the image signal is applied to the capacitor (C7) through the operational amplifier (IC8). As soon as the holding clock (HC) rises up to the high level, the analogue switch (IC8) is turned off. Therefore, the capacitor (C7) memorizes a previous voltage just before the turning off of the analogue switch (IC8).

A non-inverted input of the operational amplifier (IC2) is connected to the capacitor (C7). The operational amplifier (IC2) acts as a voltage follower because of output of the operational amplifier (IC2). As a result, the operational amplifier (IC2) generates the same voltage as the voltage memorized in the capacitor (C7).

As shown in FIG. 3 at 'A', the voltage of the image signal, which is converted by the image scanner (10), rises gradually toward a certain voltage which corresponds to the luminosity of the scanned spot, after the scanning clock (TXCK) falls down. Accordingly, the sampling clock pulse rises up after the image signal is almost saturated. Therefore, the image signal can be sampled more accurately.

The output of the operational amplifier (IC2) is supplied to the peak hold circuit. The peak hold circuit comprises an operational amplifier (IC4), a diode (D1), a capacitor (C5) and variable resistor (VR1).

The output of the operational amplifier (IC2) is connected to a non-inverted input of an operational amplifier (IC4). The output of the operational amplifier (IC4) is connected to an anode terminal of the diode (D1).

The cathode terminal of the diode (D1) is connected to the inverted input of the operational amplifier (IC4). A capacitor (C5) is connected between the cathode terminal of the diode (D1) and the ground line. The voltage on the cathode terminal of the diode (D1) rises while the voltage level on the non-inverted input of the operational amplifier (IC4) rises. The voltage on the cathode terminal of the diode (D1) is memorized in the capacitor (C5). The voltage which is memorized in the capacitor (C5) is sustained if the voltage level on the non-inverted input of the operational amplifier (IC4) falls. The voltage which is memorized in the capacitor (C5) corresponds to the most luminous portion of the scanned document. That is to say, the voltage which is memorized in the capacitor (C5) represents the luminosity of blank portion on the documents.

A variable resistor (VR1) is connected between the cathode terminal of the diode (D1) and the ground line. The variable resistor (VR1) divides the voltage which is memorized in the capacitor (C5), and determines a threshold level for dividing black level and white levels. The variable resistor (VR1) is adjusted properly so that a better monochrome image can be obtained based on a difference of luminosity between the document and the image.

The output of the sampling and holding circuit is applied to the inverted input of a comparator (IC3) through a resistor (R42). Further, the output of the peak hold circuit is applied to the non-inverted input of a comparator (IC3) through a resistors (R5). The comparator (IC3) compares a threshold level which is supplied from the peak hold circuit through the resistor (R5) with the image signal which is supplied from the sampling and holding circuit through the resistor (R42). The comparator (IC3) converts the image signal into either a black or white level.

The output of the comparator (IC3) is connected to a data input terminal of a D-type flip flop (DFF) through a resistor (R6). The sampling clock (SC) is supplied to a clock terminal of the D-type flip flop (DFF). The D-type flip flop (DFF) makes the output of the two valued converter (11) synchronous with the sampling clock pulses (SC). Further, the D-type flip flop (DFF) delays the output of the two valued converter (11). As shown in FIG. 3 at 'G', the D-type flip flop (DFF) latches the signal on the data input terminal. The output of the D-type flip flop (DFF) is fed to the inverted input of the comparator (IC3) through a resistors (R41). That is to say, the output of the D-type flip flop is fed back to the inverted input of the comparator (IC3).

The half tone between the black and the white levels is processed by the feed back of resistors (R41).

When the output of the operational amplifier (IC2) is a little bit higher than the threshold level, the low level output, which corresponds to the white level in this embodiment, is supplied from the comparator (IC3) to the D-type flip flop (DFF). Accordingly, the D-type flip-flop (DFF) generates the low level output in response to a rising edge of the scanning clock (SC). The low level signal which is generated by the D-type flip flop (DFF) is fed to the inverted input of the comparator (IC3) through the resistor (R41).

As a result of this, the voltage on the inverted input of the comparator (IC3) is reduced and becomes less than the threshold level. Then the comparator (IC3) generates a high level output which corresponds to the black level in this embodiment. Accordingly, the output of the D-type flip flop (DFF) is reversed in response to a rising of the sampling clock pulse (SC).

Thus, the D-type flip flop (DFF) generates an alteration of the black and the white levels, when the output signal from the sampling and holding circuit (i.e. the output of the operational amplifier (IC2) is close to the threshold level. Consequently, the luminosity which is close to the threshold level is processed as an alteration of the black and white levels.

While the D-type flip flop (DFF) generates the alteration of the black and white levels, the printer (15) prints an alteration of the black and white dots. As a result of this, the printed portion of the document looks like gray.

In this embodiment, the gray is expressed by the alteration of the black and the white levels. Therefore, the gray level (i.e. half tone) can be processed by only a two valued circuit for processing the black and the white levels. That is to say, additional circuits for processing half tones are not required based on this invention.

Various modification may be made in the invention without departing from the scope or spirit of the invention. Therefore, the output from the D-type flip plot (DFF) may be applied to the output of the peak hold circuit (i.e. the output of the variable resistor (VR1)).

What is claimed is:

1. A two value distinguishing circuit, having an analogue serial input signal including image information, comprising:
    two value distinguishing means for receiving an analogue signal magnitude corresponding to said analogue serial input signal at an input terminal, comparing said analogue signal magnitude to a threshold level and outputting a distinguishing signal having a large value when said analogue signal magnitude is less than or equal to said threshold level or a small value when said analogue signal magnitude is greater than said threshold level;
    delay means for receiving said distinguishing signal from the two value distinguishing means and, after a delay of a predetermined amount of time, outputting a delayed signal equal in value to said distinguishing signal; and
    correction means for receiving said delayed signal from said delay means and outputting a correction means output to said input terminal of said two value distinguishing means thereby reducing the analogue signal magnitude when said correction means output is equal to said small value and increasing said analog signal magnitude when said correction means output is equal to said large value, wherein said correction means output from said correction means continuously changes between said large value and said small value when said analogue signal magnitude is close to said threshold level.

2. A two value distinguishing circuit, according to claim 1, wherein:
    said two value distinguishing means identifies said analogue serial input signal having a level close to said threshold level as a middle signal by continuously alternating the output signal between said large value signal and said small value signal;
    said two value distinguishing means identifies said analogue serial input signal having a level much less than said threshold level as a low signal by continuously outputting said large value signal; and
    said two value distinguishing means identifies said analogue serial input signal having a level much higher than said threshold level as a high signal by continuously outputting said small value signal.

3. A two value distinguishing circuit as in claim 1, in combination with an image processing device including an image sensor for reading an image and providing said analogue signal.

4. A two value distinguishing circuit as in claim 3, wherein said image processing device includes a facsimile device, comprising: an image data transmitting means for transmitting said output of said correction means as a two value distinguishing image signal to other facsimile devices.

5. A two value distinguishing circuit, having an analogue serial input signal including image information, comprising:
    sample and hold means for sampling and holding the analogue serial input signal according to a sample hold clock pulse and outputting a sample/hold signal;
    comparitor means for comparing the sample/hold signal output of the sample and hold means applied at a first input terminal of the comparitor means with a threshold level signal applied at a second input terminal of the comparitor means and outputting a comparitor signal having one of a first magnitude when the sample/hold signal is less than or equal to the threshold level and a second magnitude different from the first magnitude when the sample/hold signal is greater than the threshold level;
    latch means for latching the output of the comparitor means based upon a latch clock pulse and outputting a latched signal equal in magnitude to a magnitude of the latched sample/hold signal;
    feedback means for receiving the latched signal and supplying a feedback signal to the first input terminal of said comparitor means wherein, the feedback signal increases the magnitude of the sample/hold signal when the latched signal is of the first magnitude and decreases the magnitude of the sample/hold signal when the latched signal is of the second magnitude.

6. A two value distinguishing circuit as in claim 5, in combination with an image processing device including an image sensor for reading an image and providing said analogue signal.

7. A two value distinguishing circuit as in claim 6, wherein said image processing device includes a facsimile device, comprising: an image data transmitting means for transmitting an output of said latch means as a two value distinguishing image signal to other facsimile devices.

* * * * *